J. H. Dorst,
Faucet.
No. 98,749.   Patented Jan. 11, 1870.
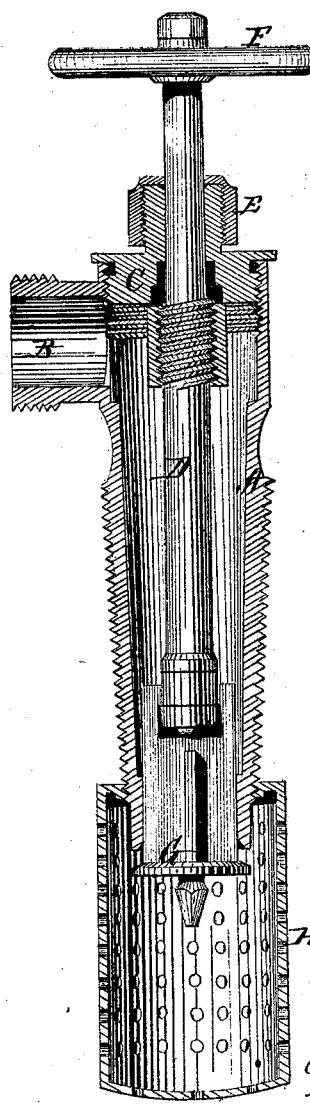
Witnesses.
C. L. Evert
A. N. Seatman
Inventor.
John H. Dorst
per
Alexander Mason
Attys.

United States Patent Office.

JOHN H. DORST, OF NEW ALBANY, INDIANA.

Letters Patent No. 98,749, dated January 11, 1870.

IMPROVEMENT IN FAUCETS.

The Schedule referred to in these Letters Patent and making part of the same.

*To all whom it may concern:*

Be it known that I, JOHN H. DORST, of New Albany, in the county of Floyd, and in the State of Indiana, have invented certain new and useful Improvements in Faucets; and do hereby declare that the following is a full, clear, and exact description thereof, reference being had to the accompanying drawings, and to the letters of reference marked thereon, making a part of this specification.

The nature of my invention consists in the construction and general arrangement of an "anti-freezing valve-faucet," as will be hereinafter fully set forth.

In order to enable others skilled in the art to which my invention appertains, to make and use the same, I will now proceed to describe its construction and operation, referring to the annexed drawings, which represent a longitudinal vertical section of my faucet.

A represents the main body of the faucet, tapering in form, and provided with screw-threads on the outside, so as to be readily screwed into any tank or barrel, or any place where it is desired to use the same.

The body A is, near its outer or front end, provided with a side tube or pipe, B, which has screw-threads on the outside, so that a conducting-pipe may be readily attached thereto.

At the upper or outer end of the main body A, is screwed in a nut, C, through which the valve-stem D passes, said stem being provided with screw-threads, meshing with female screw in the nut, or rather in a projection on the inner end of the nut C, so that the valve-stem may be operated by turning the same.

A stuffing-box, E, is placed around the valve-stem D, at the outer end of the nut C, and at the outer end of the stem is secured a wheel, F, by means of which the valve is operated.

To the inner end of the stem D, the valve G is attached, by a swivel-joint, so as to give the valve play, in order to always seat itself properly.

The valve G has four wings, placed at right angles, and extending into the main body A, and in opening and shutting the valve there will be scarcely any friction on the wings, on account of the swivel-joint.

On the inside of the vessel, to which the faucet is attached, and surrounding the inner end of the faucet, is a strainer, H, which will prevent the cock or its valve from being obstructed or choked up with any solid substance that may be in the liquid.

The faucet thus constructed can be fixed in a vertical or horizontal position, or, in other words, it can be inserted at the bottom or side of a tank, and a pipe attached to it, with or without an elbow, owing to position.

It is admirably adapted to supply boilers with water; the water is easily regulated with it; and then, whenever the supply is cut off, it empties itself so nicely, that freezing will never injure it, thus saving the extra expense and trouble of having a cock or valve on the inside of the tank.

The stem is not too long, so as to unship the valve, yet long enough to pack the stuffing-box. The valve is easily reground, owing to the swivel connecting it with the stem.

Ordinarily, a supply-cock, feeding steam-boilers, has the inner end from two to three inches above the bottom of the tank, and where, in quite cold climates, the cock will have to be very long inside of the vessel, I propose to have an extra tube or pipe, to make the proper length, screwed on the cock, making stem and valve to suit.

Having thus fully described my invention,

What I claim as new, and desire to secure by Letters Patent, is—

The combination and arrangement of the main body A, with side tube B, nut C, valve-stem D, stuffing-box E, wheel F, wing-valve G, and strainer H, all constructed as described, and operating substantially as and for the purposes herein set forth.

In testimony that I claim the foregoing, I have hereunto set my hand, this 1st day of September, 1869.

JNO. H. DORST.

Witnesses:
C. W. COTTOM,
T. D. CRANE.